United States Patent Office 3,419,141
Patented Dec. 31, 1968

3,419,141
SORTING MACHINE FOR C-SHAPED ARTICLES
Howard H. Aiken, Fort Lauderdale, Fla., James T. Marsh, Leonardtown, Md., and Allan I. Parvin, Clifton, N.J., assignors to Aiken Industries, Inc., a corporation of Delaware
Filed May 15, 1967, Ser. No. 638,344
10 Claims. (Cl. 209—73)

ABSTRACT OF THE DISCLOSURE

A sorting machine for sorting C-shaped articles according to the gap between the open legs of the article utilizes a sorting bar varying in dimension from one end to the other. The articles are strung onto one end of the sorting bar and then stepped along the bar by a walking beam arrangement while being allowed to hang at each increment of movement along the bar. When the gap between the open legs of the C-shaped article is greater than the decreasing dimension of the bar, the article drops into a sorted article receptacle. The sorting bar is horizontal and the sorted articles are stepping by reciprocation of the bar and oscillation of a supporting table in synchronism.

---

This application relates to improvements in sorting machines and particularly to a machine for sorting C-shaped articles according to the dimension of the gap between the open legs of the C-shaped article. Although not limited thereto, the invention is especially applicable to sorting bimetals of the type used in thermal trip circuit breakers and the invention will be described in connection with this preferred embodiment.

C-shaped bimetals used in thermal trip circuit breakers will trip the breaker when the legs of the bimetal are spread by heating. The tripping characteristic of the circuit breaker is determined by the bimetal and more specifically determined by the gap between the open legs of the bimetal. In order to determine in advance the tripping characteristics of a breaker bimetals having the distance between the open ends of the legs accurately gauged are required. This accuracy is very important. Even 1/1000 of an inch in spread of the legs of the bimetal can result in considerable difference in the opening time of response of the circuit breaker. If the bimetal is accurately gauged, less calibration is required in the assembled circuit breaker, and fewer circuit breakers are rejected, both of which very favorably affect the economics of manufacture of such circuit breakers. No prior arrangements for sorting such bimetals are known to applicants.

This invention utilizes a sorting bar or gauge rod which varies in dimension from one end to the other, and the C-shaped bimetal articles are threaded or strung onto one end of the rod. The rod is horizontal and if the space between the legs of the bimetal is greater than the sectional dimension of the rod, the bimetal will fall off. The bimetal C-shaped article must hang by gravity during the sorting as it is very difficult to push the articles down the rod, either mechanically or by gravity and vibration and still obtain the required accuracy of sorting. Pushing of the bimetal bottoms tends to cant the bimetals upwardly, pushing on the top and force them over the gauge rod. Tipping the bimetals one small bit results in incorrect results of gauging.

The foregoing and other features and advantages of the invention will be apparent from the following more particular description of preferred embodiments of the invention, as illustrated in the accompanying drawings.

In the drawings:

FIGURE 5 is a perspective view of one end of the gauge bar of this invention;

FIGURE 6 is a perspective view of the bimetal article to be sorted which is generally C-shaped in section;

Figure 1:
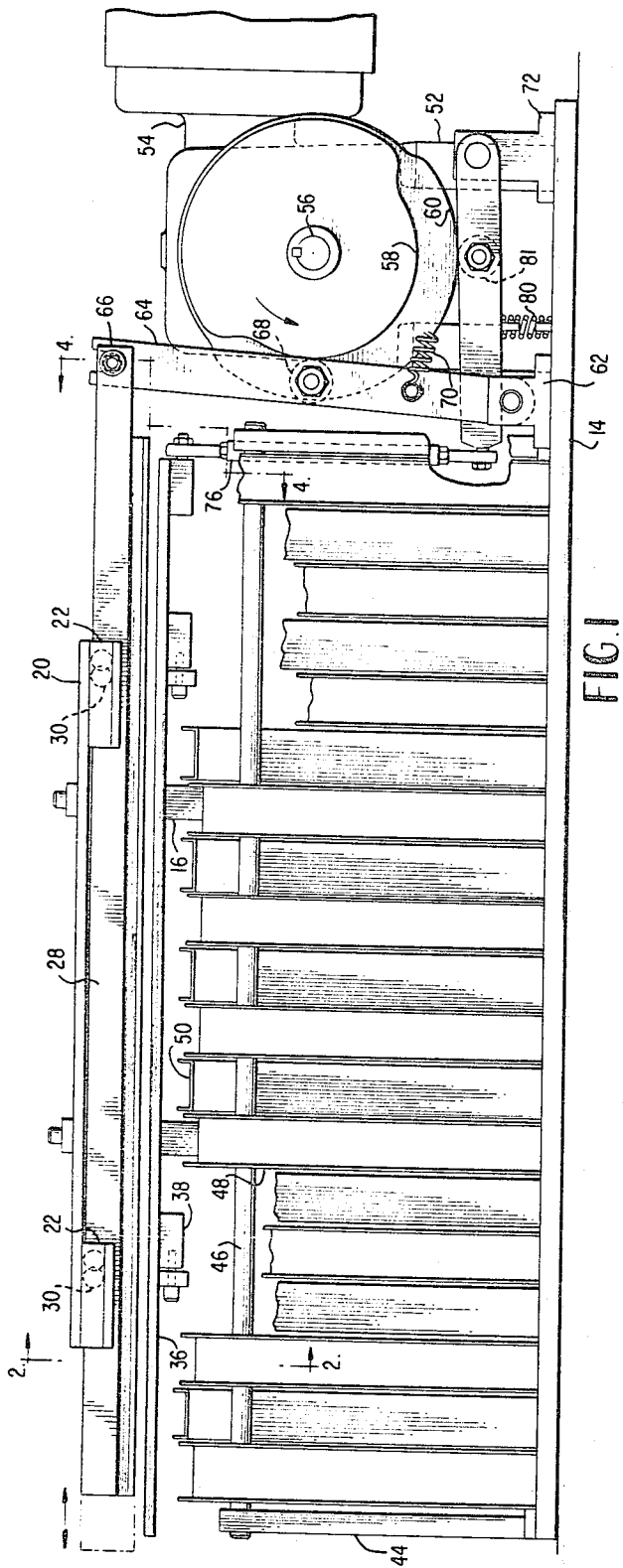
FIGURE 1 is a side elevation view of the sorting machine of this invention with a portion broken away for the sake of clarity.

FIGURES 7A, 7B, 8A, 8B, 9A, 9B, 10A, 10B, 11A, and 11B, are diagrammatic side views of the apparatus shown in FIGURE 1 illustrating the sorting operation.

Figure 2:
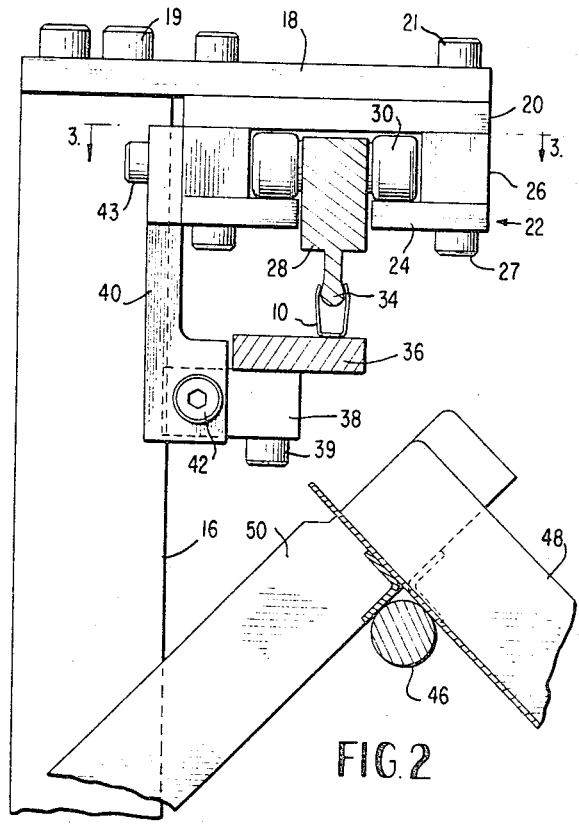
FIGURE 2 is a sectional view taken along line 2—2 of FIGURE 1.
Figure 3:
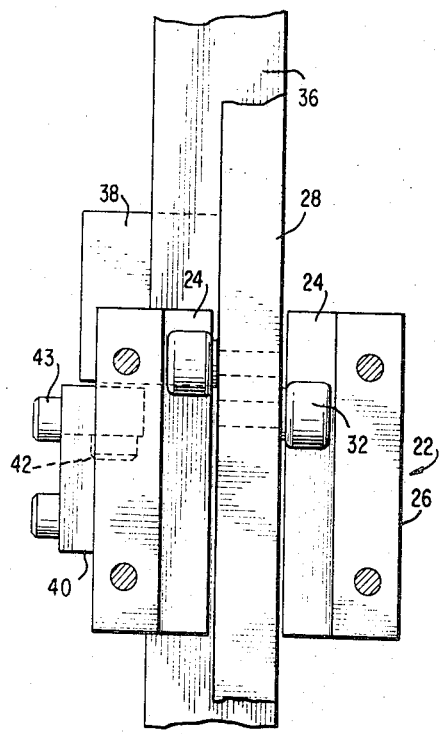
FIGURE 3 is a sectional view taken along line 3—3 of FIGURE 2.

The articles to be sorted are, in the preferred embodiment, bimetal articles which are generally C-shaped in section. A bimetal 10 is shown in detail in FIG. 6 and includes longitudinally extending feet 11 and upstanding legs 12 which are curved inwardly at their top to form an article which is generally C-shaped in section, see FIGS. 2 and 4. Between the ends of legs 12 there is a gap G which is quite important to the calibration of a circuit breaker in which the bimetal is used. The bimetal articles 10 are sorted according to the dimension of gap G by the machine of this invention.

Referring to FIG. 1, the sorting machine of this invention includes a base 14 from which upright columns 16 extend. These columns support hangers 18 by suitable screws 19 and a top plate 20 is carried by hanger 18 being secured thereto by screws 21.

A track 22 is provided at two spaced-apart portions of the underside of top plate 20. This track includes a bottom plate 24, a side bar 26 and suitable screws 27.

A gauge bar 28 shown in more detail in FIG. 5 includes rollers 30 and 32 extending from opposite sides thereof and engageable in track 22. Thus, the bar 28 may traverse in a reciprocating manner as shown in the phantom lines and arrow of FIG. 1. Extending from the bottom side of gauge bar 28 is an elongated gauge bar head 34. This gauge bar head decreases in diameter from an entrance end of the machine to an exit end of the machine. The critical gauge dimension W shown in FIG. 5 may vary in decreasing steps or may continuously decrease as shown. The gauge bar head shown is a conically tapered rod secured to the gauge bar body. There is a step 37 in the conical taper at the small end of the rod so that all bimetals which have not previously dropped from the rod into a sorting chute will drop from the small diameter end of the rod.

Beneath the gauge bar is a table 36. The table 36 is adapted to oscillate about a longitudinally extending pivotal axis and for this purpose includes pivot blocks 38 secured thereto by screw 39. Three blocks are pivotally attached to a pivot bracket 40 by a shoulder screw pivot pin 42. The bracket 40 in turn is secured to the track 22 by screws 43, see FIG. 2.

Beneath the table, a pair of supports, 44, extending upwardly from base 14 carry a chute rest rod 46 which in turn supports the top ends of a number of front chutes 48 and rear chutes 50.

For the purposes of oscillating the table 46 while reciprocating or traversing the gauge rod 28 in synchronism, a drive arrangement is provided at one end of the machine, see FIG. 1. This drive arrangement includes a support 52 for a motor reducer unit 54 of a known type. A drive shaft 56 carries a pair of cams 58 and 60. Cam 58 is for traversing the gauge bar 28 while cam 60 is for tilting the table 36.

A pivot block 62 on base 14 pivotally mounts one end of a traverse arm 64. A slot and pin arrangement 66 at the other end of arm 64 connects it to the gauge bar 28. A cam follower 68 is carried by arm 64 and abuts the traverse cam 58. A spring 70 is connected to arm 64 to bias the cam follower into an engagement with the cam.

A pivot block 72 is also positioned on base 14 and pivotally supports at one end tilt arm 74. The tilt arm is connected at its other end to a connecting rod 76. The upper end of connecting rod 76 is connected to a pivot 77 extending from a block 78 which block is secured to table 36 by screw 79. A spring 80 biases the arm 74 and a cam follower 81 thereon against the periphery of the tilt cam 60.

Figure 4:
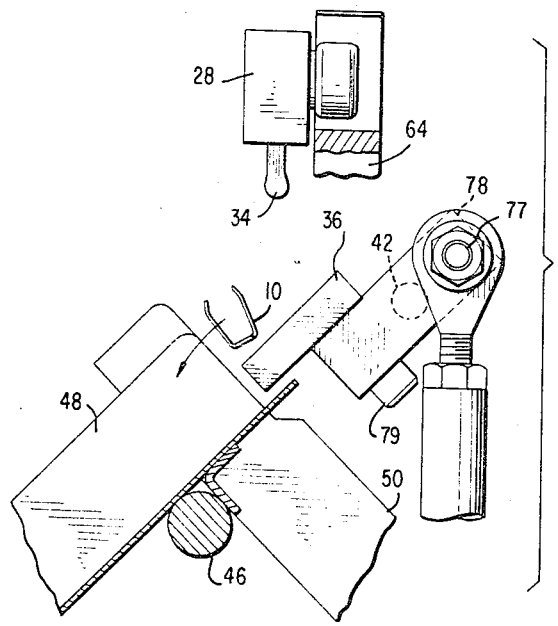
FIGURE 4 is a sectional view similar to FIGURE 2 taken along line 4—4 of FIGURE 1.

In operation, as the drive shaft 56 rotates counterclockwise as viewed in FIG. 1, cam 58 contacts follower 68 causing traverse arm 64 to oscillate and correspondingly reciprocating the gauge beam or bar 28. Similarly, rotation of cam 60 causes oscillation of tilt arm 74 causing reciprocation of connecting rod 76 which in turn being connected as shown in FIG. 4 oscillates table 36 about its pivot axis 42.

The sorting operation can best be described when considering the steps and sequences shown in FIGS. 7A, 7B through 11A, 11B, inclusive.

Figure 7A:
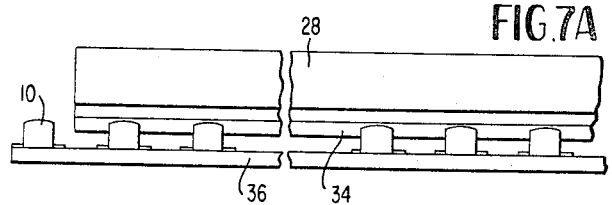
Figure 7B:
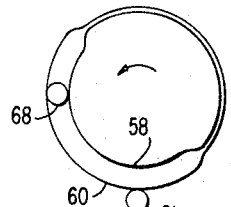
Figure 8A:
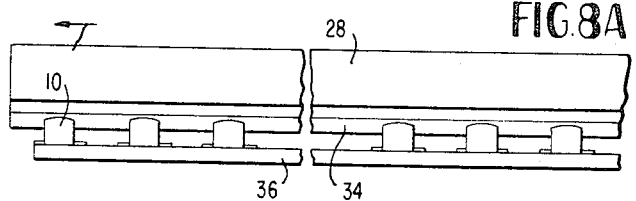
Figure 8B:
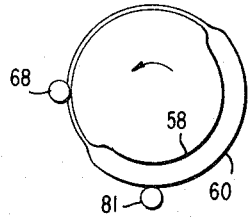
Figure 9A:
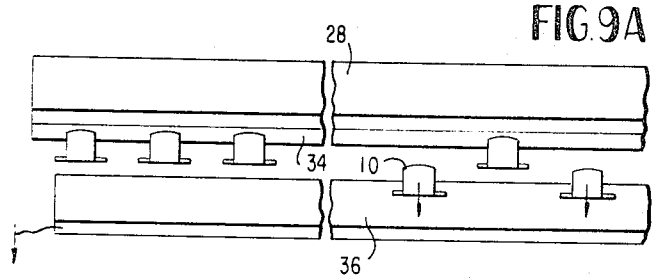
Figure 9B:
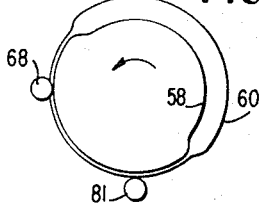

FIGS. 7A and 7B show the position of the table 36, a gauge bar 28 and cams 58 and 60 as in FIG. 1 at the start of a gauging operation. At this time, an article 10 to be gauged is placed on the surface of table 36 at its left end and the gauge bar 28 is in its rightmost position. The articles may be fed onto table 36 for gauging one at a time by a commercially available escapement mechanism. As the drive shaft 56 and the two cams rotate 90°, the beam 28 is traversed to the left as shown in FIG. 8A. At this time, the position of the cams is as shown in FIG. 8B. Movement of the bar to the left has threaded or strung the article 10 to be gauged onto the gauge head 34 at the widest end thereof. It has also caused previously strung bimetals to shift on the gauge bar because the frictional force of the bimetal resting on table 36 is much greater than the friction of the gauge head sliding inside the gap of the C-shaped bimetal. Further rotation of the cams 90° to the position shown in FIG. 9B results in the tilting of the table 36 as shown in FIG. 9A. At that time, the endmost bimetal and other bimetals previously on the gauge bar using hang free from the head 36. Any bimetal whose gap dimension G is wider than the gauge head dimension W at the point where it is held on the gauge head will fall vertically downward and into one of the chutes 49 or 50 at that longitudinal position. As is shown in FIG. 9A the articles just loaded onto the gauge bar did not fall off but several of the articles toward the right hand end of the gauge bar have fallen off.

Figure 10A:
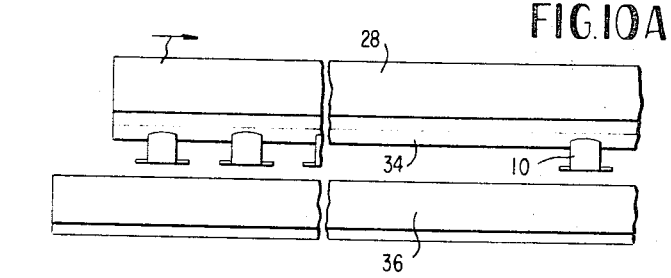
Figure 10B:
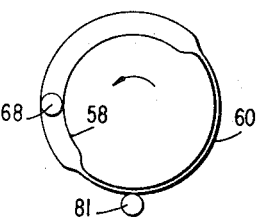
Figure 11A:
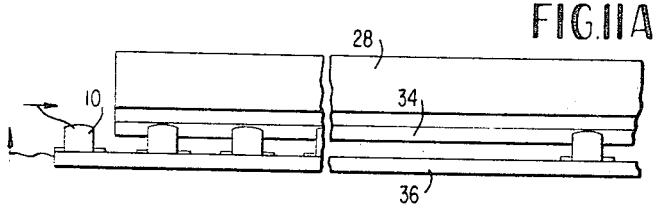
Figure 11B:
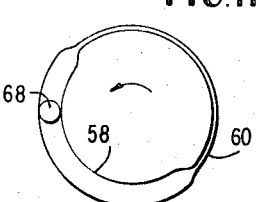

During continued rotation of the cam a further 90° segment as shown in FIG. 10B, a gauge bar 28 traverses to the right as shown in FIG. 10A. Further rotation of the cams another 90° as shown in FIG. 11B causes the table to tilt back up to its horizontal position shown in FIG. 11A. FIG. 11A is the same condition as FIG. 7A and at this time another bimetal can be loaded into the left side of table 36.

In summary, applicant has provided a unique arrangement for sorting bimetals by the width of the gap across the legs of the bimetals utilizing a sorting gauge bar having decreasing diameter. The gauge bar is horizontal at all times and the articles are moved relative to the gauge bar by walking beam movement which includes traversing reciprocation of the gauge bar and oscillation of a supporting table. This results in a highly efficient and reliable sorting machine for articles of the shape of the bimetal shown in FIG. 6.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A sorting machine for sorting articles which are generally C-shaped in section according to a dimension across the gap between the open ends of the legs of the C-shaped article, the machine comprising; an elongated sorting bar having a varying diameter along the length of the bar, the diameter at any one point corresponding to a desired gap dimension of an article to be sorted, means for moving the articles relative to the bar from one end of the bar having a diameter greater than the desired maximum gap to the other end of the bar having a diameter less than the desired minimal gap, the gap of each article being positioned against the sorting diameter of the bar during the relative movement, and sorted article collecting means positioned along the length of the sorting bar.

2. A sorting machine for sorting articles as claimed in claim 1 wherein the means for moving the articles relative to the bar comprises a walking beam arrangement for moving the article relative to the bar in a step by step movement.

3. A sorting machine for sorting articles as claimed in claim 2 wherein the walking bar arrangement includes the sorting bar and a movable support table for articles on the bar, the table being adjacent the sorting bar.

4. A sorting machine for sorting articles as claimed in claim 3 wherein the sorting bar is longitudinally reciprocated, and the movable support table is moved into and out of article supporting position in synchronism with the bar reciprocation.

5. A sorting machine for sorting articles as claimed in claim 4 wherein the support table is oscillated about a longitudinal pivot axis parallel to the bar.

6. A sorting machine for sorting articles as claimed in claim 1 wherein the varying diameter of the sorting bar is constantly decreasing from the large diameter end of the bar to a small diameter end of the bar.

7. A sorting machine for sorting articles as claimed in claim 1 wherein the sorted article collecting means are separate collecting chutes positioned below the bar so that when the gap of an article is less than the diameter of the bar at the position of the articles, the article drops from the bar into a collecting chute.

8. A sorting machine for sorting articles as claimed in claim 1 wherein the articles are C-shaped bimetals used in thermal trip circuit breakers.

9. A method of sorting generally articles which are C-shaped in section according to a dimension across the gap between the open ends of the C, the method comprising;
 (a) stringing the articles on a large diameter end of an elongated sorting bar having a control diameter varying from the large diiameter end of the bar to a small diameter end of the bar,
 (b) allowing the articles to hang by gravity from the bar with the gap on the upper side of the bar, and
 (c) feeding the articles along the length of the bar so that when the gap in an article is greater than the control diameter of the bar, the article will drop from the bar.

10. A method of sorting generally C-shaped articles as claimed in claim 9 wherein the feeding is accomplished in discrete step by step movements by supporting the article from below while shifting the articles relative to the bar.

References Cited

UNITED STATES PATENTS 2,369,785   2/1945   Kuehlman _____ 193—43 X
2,667,797   2/1954   Buenger _____ 209—72 X M. HENSON WOOD, Jr., *Primary Examiner.*

R. A. SCHACHER, *Assistant Examiner.*

U.S. Cl. X.R.

209—74, 80, 82